(12) United States Patent
Ananda

(10) Patent No.: US 11,709,640 B2
(45) Date of Patent: Jul. 25, 2023

(54) METHOD AND SYSTEM FOR MANAGING PAGES OF DOCUMENTS ON A MULTI-FUNCTION PRINTER

(71) Applicant: TOSHIBA TEC KABUSHIKI KAISHA, Tokyo (JP)

(72) Inventor: Anusha Mairpady Ananda, Karnataka (IN)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/704,323

(22) Filed: Mar. 25, 2022

(65) Prior Publication Data

US 2022/0382497 A1  Dec. 1, 2022

(30) Foreign Application Priority Data

May 25, 2021 (IN) .............................. 202141023231

(51) Int. Cl.
*G06F 3/12* (2006.01)
*H04N 1/00* (2006.01)

(52) U.S. Cl.
CPC .......... *G06F 3/1245* (2013.01); *G06F 3/1204* (2013.01); *H04N 1/00214* (2013.01); *H04N 1/00442* (2013.01); *H04N 2201/0094* (2013.01)

(58) Field of Classification Search
CPC . G06F 3/1245; G06F 3/1204; H04N 1/00214; H04N 1/00442; H04N 2201/0094

USPC ......................................................... 358/1.13
See application file for complete search history.

(56) References Cited

U.S. PATENT DOCUMENTS

| | | | |
|---|---|---|---|
| 7,990,580 B2 | 8/2011 | Motoyoshi | |
| 7,995,248 B2 | 8/2011 | Oguri | |
| 8,305,619 B2 | 11/2012 | Hibino et al. | |
| 8,614,818 B2 | 12/2013 | Maeshima et al. | |
| 2005/0243372 A1* | 11/2005 | Sato | G06F 3/125 358/1.18 |
| 2008/0137152 A1* | 6/2008 | Oguri | H04N 1/32064 358/440 |
| 2010/0134839 A1* | 6/2010 | Hibino | H04N 1/32502 358/1.15 |
| 2014/0215322 A1* | 7/2014 | Gunderson | G06F 40/114 715/251 |
| 2014/0313548 A1* | 10/2014 | Nishikawa | G06F 3/1238 358/1.15 |
| 2019/0238708 A1* | 8/2019 | Kozlovsky | G06F 16/93 |
| 2020/0280644 A1* | 9/2020 | Shimakawa | G06V 30/413 |
| 2021/0097275 A1* | 4/2021 | Miyauchi | G06V 30/412 |

* cited by examiner

*Primary Examiner* — Allen H Nguyen
(74) *Attorney, Agent, or Firm* — Foley & Lardner LLP

(57) ABSTRACT

A method for page management for use with an image forming apparatus includes receiving a request from a user for processing one or more pages of one or more documents. Further, the method includes displaying on a display (a) a thumbnail image generated for each page and (b) a plurality of options for processing the one or more pages. Furthermore, the method includes receiving a selection by the user of at least one option of the plurality of options. Thereafter, the method includes processing the one or more pages, according to the at least one option of the selection received from the user.

17 Claims, 7 Drawing Sheets

METHOD AND SYSTEM FOR MANAGING PAGES OF DOCUMENTS ON A MULTI-FUNCTION PRINTER

CROSS-REFERENCE TO RELATED APPLICATION

This application is based upon and claims the benefit of priority from Indian Patent Application No. 202141023231, filed on May 25, 2021, the entire contents of which are incorporated herein by reference.

TECHNICAL FIELD

The present disclosure generally relates to data processing. More particularly, the present disclosure relates to a method and a system for managing pages of documents on a Multi-Function Printer (MFP).

BACKGROUND

An MFP is a device which incorporates functionality of multiple devices. The MFP provides centralized document management/distribution/production. The functionalities include fax, photocopying, printing, scanning, and the like. The MFP performs various processing on a document such as mailing the document (e.g., emailing), storing the document, converting the document into multiple file formats, and the like. Hence, the integration of the functionalities of the multiple devices in the MFP provides centralized document management and document distribution. A user may wish to process multiple pages of various documents differently. A job may be referred as a unit of work performed by the MFP at a time. For example, processing pages of the document at one time may be referred as the job. In this case, user must provide the multiple pages for processing as multiple jobs for the MFP. Also, the user must segregate the multiple pages based on a processing requirement. When large number of pages are to be processed, valuable time of the user is lost in segregating the multiple pages to distinct groups based on the processing requirement.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method for page management for use with an MFP. The method comprises receiving a request from a user for processing one or more pages of one or more documents. Further, the method comprises displaying on a display (a) a thumbnail image generated for each page and (b) a plurality of options for processing the one or more pages. Furthermore, the method comprises receiving a selection by the user of at least one option of the plurality of options. Thereafter, the method comprises processing the one or more pages, according to the at least one of option of the selection received from the user.

In an embodiment, the present disclosure discloses a system for page management for an MFP. The system comprises one or more processors and a memory. The one or more processors are configured to receive a request from a user for processing one or more pages of one or more documents. Further, the one or more processors are configured to control a display to display (a) a thumbnail image generated for each page and (b) a plurality of options for processing the one or more pages. Furthermore, the one or more processors are configured to receive a selection by the user of at least one option of the plurality of options. Thereafter, the one or more processors are configured to process the one or more pages according to the at least one option of the selection received from the user.

In an embodiment, the present disclosure discloses a non-transitory computer readable medium including instructions stored thereon that, when processed by at least one processor, cause a system to perform operations comprising receiving a request from a user for processing one or more pages of one or more documents. Further, (a) a thumbnail image generated for each page and (b) a plurality of options for processing the one or more pages are displayed on a display. Furthermore, a selection by a user of at least one option of the plurality of options is received. Thereafter, the one or more pages are processed according to the at least one option of the selection received from the user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended claims. The disclosure itself, however, as well as a preferred mode of use, further objectives, and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
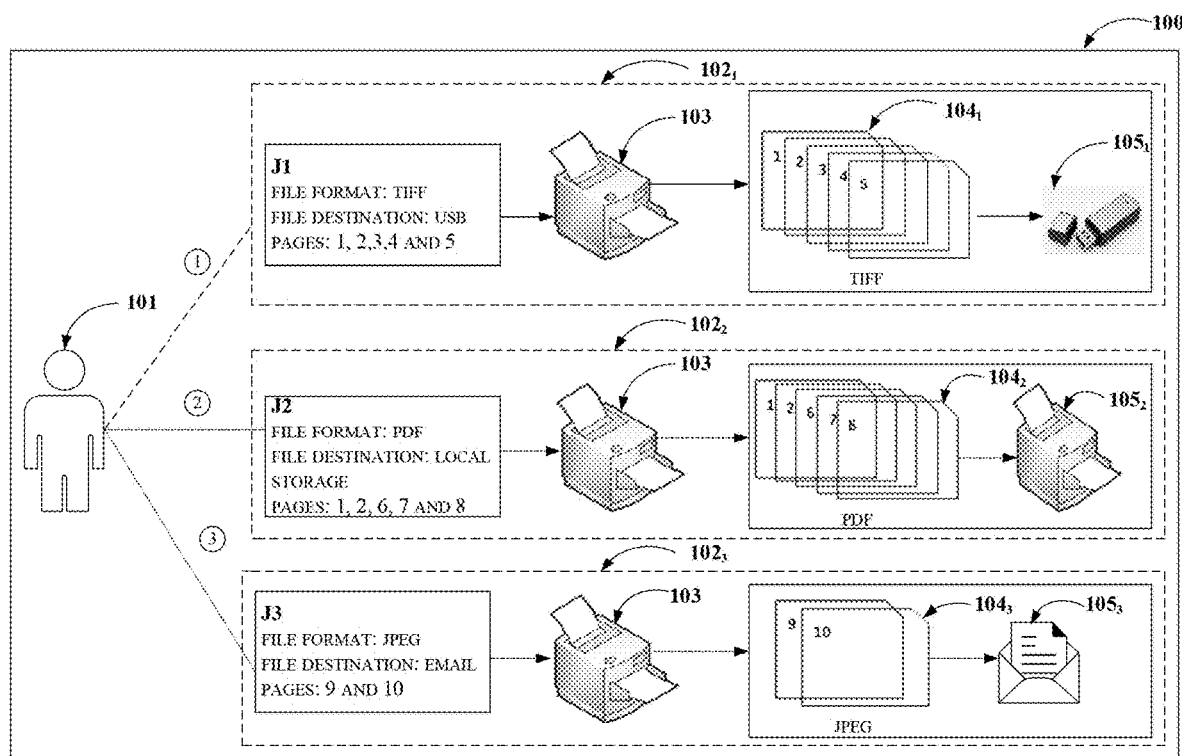
FIG. 1 shows a system for processing multiple pages of documents on an MFP.

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and a system for managing multiple pages of various documents on an MFP (which may also be referred to as an image forming apparatus or image processing apparatus). A request for processing one or more pages is received from a user. The system generates a thumbnail image for each page. Further, the thumbnail image is displayed to the user. Also, the system provides a plurality of options for processing the one or more pages. The user selects the pages and the options for processing the pages, using thumbnail images generated for corresponding pages. The one or more pages are processed based on the options selected for corresponding pages. The present disclosure allows the user to provide a request for processing the multiple pages with different processing requirements at once. Appropriate options can be specified by the user to process different pages based on the processing requirement. The present disclosure provides a time-efficient and user convenient process to manage the one or more pages efficiently.

FIG. 1 shows a system 100 for processing the multiple pages of the documents on the MFP 103. A user 101 wants to process the multiple pages 1, 2, 3 . . . , 10. The user 101 provides a first input for a first job J1 to be performed by the MFP 103. The first input may be a request to process the pages 1, 2, 3, 4, and 5 to convert the pages 1, 2, 3, 4, and 5 to Tagged Image File Format (TIFF) format and transmit the pages 1, 2, 3, 4, and 5 to Universal Serial Bus (USB) connected to the MFP 103. The user 101 has formed a group of pages 1, 2, 3, 4, and 5 to provide to the MFP 103 to perform the first job J1. Process flow $102_1$ shows execution of the first job J1. $104_1$ shows the pages 1, 2, 3, 4, and 5 converted to the TIFF format. $105_1$ shows the pages 1, 2, 3, 4, and 5 transmitted to the USB. Further, the user 101 provides a second input for a second job J2 to be performed by the MFP 103. The second input may be a request to process the pages 1, 2, 6, 7, and 8 to convert the pages 1, 2, 6, 7, and 8 to Portable Document Format (PDF) format and store the pages 1, 2, 6, 7, and 8 to local storage of the MFP 103. The user 101 has formed a group of pages 1, 2, 6, 7, and 8 to provide to the MFP 103 to perform the second job J2. Process flow $102_2$ shows execution of the second job J2. $104_2$ shows the pages 1, 2, 6, 7, and 8 converted to the PDF format. $105_2$ shows the pages 1, 2, 6, 7, and 8 stored in the local storage. Further, the user 101 provides a third input for a third job J3 to be performed by the MFP 103. The third input may be a request to process the pages 9 and 10 to convert the pages 9 and 10 to Joint Photographic Experts Group (JPEG) format and mail the pages 9 and 10 to another user. The user 101 has formed a group of pages 9 and 10 to provide to the MFP 103 to perform the third job J3. Process flow 1023 shows execution of the third job J3. $104_3$ shows the pages 9 and 10 converted to the JPEG format. 1053 shows the pages 9 and 10 mailed to another user. Hence, the user 101 must segregate the multiple pages to distinct groups based on the processing requirement, before processing the multiple pages. This process is time-consuming and cumbersome for the user 101.

Figure 2:
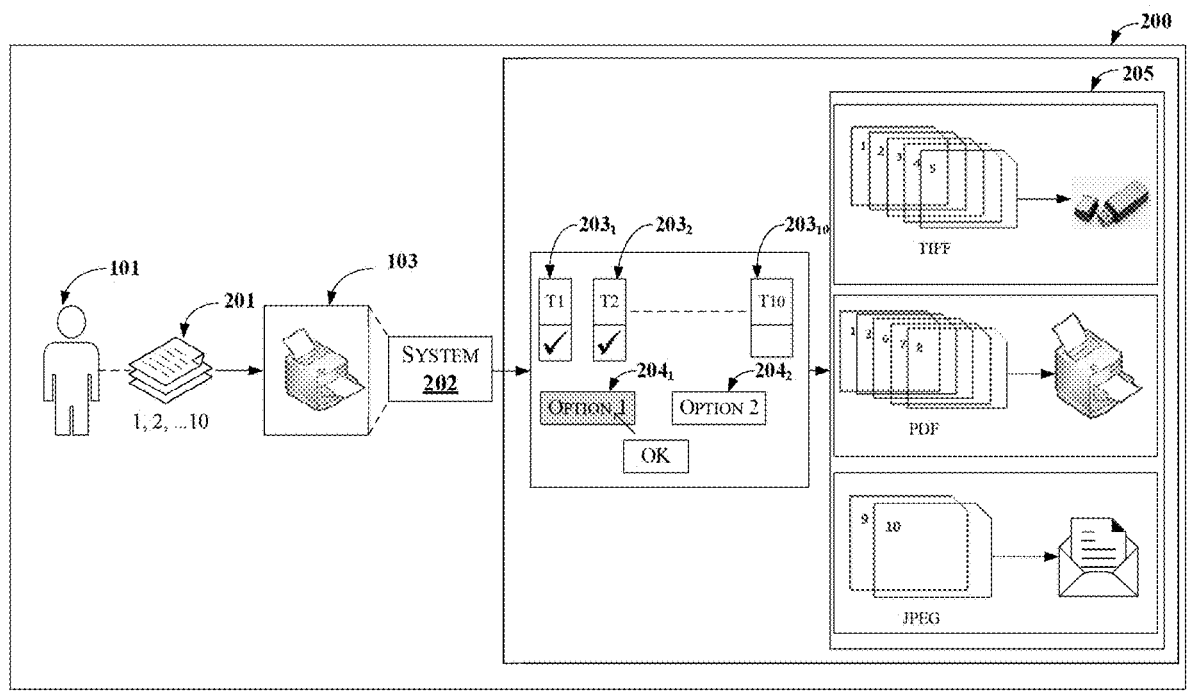
FIG. 2 shows an exemplary environment for managing pages of documents on an MFP, in accordance with some embodiments of the present disclosure.

FIG. 2 illustrates an exemplary environment 200 for managing pages of documents on an MFP, in accordance with some embodiments of the present disclosure. The exemplary environment 200 comprises a user 101, an MFP 103, and a system 202 (e.g., a controller). The system 202 may include one or more features that differ from and provide advantages over the system 100. The user 101 may request the MFP 103 to process one or more pages 1, 2, . . . . 10 of one or more documents (not shown in FIG. 2). 10 pages are shown in FIG. 2 for illustrative purposes. The user 101 may request processing N number of pages. The one or more pages 1, 2, . . . 10 is referred as the one or more pages 201 in FIG. 2. The one or more pages 201 may be pages of a document related with the user 101. For example, the one or more pages 201 may be pages of a passport, an informational report, and the like. In another example, each of the one or more pages 201 may be from single page documents related with the user 101. For example, the one or more pages 201 may be a driver's license, identification card, birth certificate, and the like. The system 202 may be associated with the MFP 103. The system 202 may be configured to manage the one or more pages 201 of the one or more documents. In an embodiment, the one or more pages 201 may be received from the user 101 for performing scanning operation using the MFP 103. In another embodiment, the one or more pages may be pre-stored in a memory unit associated with the MFP 103.

The system 202 may be configured to receive the request for processing the one or more pages 201 of the one or more documents, from the user 101. The request may be to perform scanning of the one or more pages 201, transmission of the one or more pages 201, converting the one or pages 201 to a file format, and the like. Further, the system 202 may generate a thumbnail image 203 for each page from the one or more pages 201. The thumbnail image 203 is a reduced-size image version of the one or more pages 201. The thumbnail image 203 is used to help in recognizing the one or more pages 201. T1, T2, . . . T10 illustrates 10 thumbnail images of 10 pages. N thumbnail images are generated for N number of pages. The thumbnail image T1 is represented as $203_1$ in FIG. 2. Similarly, the thumbnail image T2 may be referred as $203_2$. The thumbnail image T10 may be referred as $203_{10}$. The thumbnail images for each page from the one or more pages 201 are referred as the thumbnail images 203 hereafter in the present description.

Further, the system 202 is configured to display the thumbnail image 203 generated for each page from the one or more pages 201. Furthermore, the system 202 is configured to display a plurality of options for processing the one or more pages 201. The plurality of options are represented as option 1 $204_1$ and option 2 $204_2$ in FIG. 2. For example, the option 1 $204_1$ may be a file format for storing the one or more pages 201. The option 2 $204_2$ may be a transmission destination for transmitting the one or more pages 201. Two options are shown for illustrative purposes only and should not be considered as a limitation. The plurality of options is referred to as the plurality of options 204 hereafter in the present description. The system 202 is configured to receive a selection of the plurality of options 204 for the one or more pages 201, from the user 101. The thumbnail image 203 may be a preview of a corresponding page to the user 101. The user 101 may select the one or more pages 201 from the thumbnail images 203. Consider that the user 101 may desire to store page 1 and page 2 from the one or more pages 201 in a TIFF format and transmit the page 1 and page 2 to a USB. The user 101 may select the page 1 and page 2 from respective thumbnail images T1 and T2. Further, the user 101 may select the option 1 $204_1$ indicating the TIFF format. The selection of the option 1 $204_1$ is illustrated in FIG. 2. The user 101 may select the option 2 $204_2$ for transmitting the page 1 and page 2 to the USB.

Further, the system 202 may be configured to process the one or more pages 201, based on corresponding selection received from the user 101. The processing of the one or more pages 201 may comprise storing the one or more pages 201 in a required file format, transmitting the one or more pages 201 to a transmission destination, and the like. For example, pages 1, 2, 3, 4, and 5 may be converted to a TIFF format and transmitted to USB connected to the MFP 103. Pages 1, 2, 6, 7, and 8 may be converted to a PDF format and stored in a local storage of the MFP 103. Pages 9 and 10 may be converted to a JPEG format and sent to a mailbox. The outputs of the MFP 103 is shown as 205 in FIG. 2. In an embodiment, the system 202 managing the one or more pages 201 of the one or more documents on the MFP 103, may be implemented in a variety of computing systems, such as a laptop computer, a desktop computer, a Personal Computer (PC), a notebook, a smartphone, a tablet, e-book readers, a server, a network server, a cloud-based server and the like. In an embodiment, the system 202 may be integrated with the MFP 103. The system 202 may reside in the MFP 103. The system 202 may connect to the MFP 103 using a wired connection. In another embodiment, the system 202 may communicate with the MFP 103 over a communication network (not shown in FIG. 2). The communication network may include, without limitation, a direct interconnection, local area network (LAN), wide area network (WAN), wireless network (e.g., using Wireless Application Protocol), the Internet, etc.

Figure 3:
FIG. 3 illustrates an internal architecture of a system for managing pages of documents on an MFP, in accordance with some embodiments of the present disclosure.

FIG. 3 illustrates an internal architecture 300 of the system 202 for managing the one or more pages 201 of the one or more documents on the MFP 103, in accordance with some embodiments of the present disclosure. The system 202 may include Central Processing Units 303 (also referred as "CPUs" or "one or more processors 303"), an Input/Output (I/O) interface 301, and a memory 302. In some embodiments, the memory 302 may be communicatively coupled to the processor 303. The memory 302 stores instructions executable by the one or more processors 303. The one or more processors 303 may comprise at least one data processor for executing program components for executing user or system-generated requests. The memory 302 may be communicatively coupled to the one or more processors 303. The memory 302 stores instructions, executable by the one or more processors 303, which, on execution, may cause the one or more processors 303 to manage the one or more pages 201 of the one or more documents on the MFP 103. In an embodiment, the memory 302 may include one or more modules 305 and data 304. The one or more modules 305 may be configured to perform the steps of the present disclosure using the data 304, to manage the one or more pages 201 of the one or more documents on the MFP 103. In an embodiment, each of the one or more modules 305 may be a hardware unit which may be outside the memory 302 and coupled with the system 202. As used herein, the term modules 305 refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide described functionality. The one or more modules 305 when configured with the described functionality defined in the present disclosure will result in a novel hardware. Further, the I/O interface 301 is coupled with the one or more processors 303 through which an input signal or/and an output signal is communicated. For example, the system 202 may receive the request for processing the one or more pages 201 and the selection of the plurality of options 204 from the user 101, via the I/O interface 301.

In one implementation, the modules 305 may include, for example, an input module 311, a thumbnail image display module 312, a selection input module 313, a processing module 314, and other modules 315. It will be appreciated that such aforementioned modules 305 may be represented as a single module or a combination of different modules. In one implementation, the data 304 may include, for example, input data 306, thumbnail image data 307, selection data 308, process data 309, and other data 310.

In an embodiment, the input module 311 may be configured to receive a request for processing the one or more pages 201, from the user 101. The one or more pages 201 may be from the one or more documents. For example, the one or more pages 201 may all be from the same document. In another example, the one or more pages 201 may be from various documents. In one embodiment, the request may be to perform scanning of the one or more pages 201. The one or more pages 201 of the one or more documents may be received from the user 101 along with the request for processing the one or more pages. In the embodiment, the request may comprise one or more properties for scanning the one or more pages 201, when the request is for scanning the one or more pages 201. The one or more properties may comprise image resolution, color mode for scanning the one or more pages 201, and the like. In another embodiment, the one or more pages 201 may be pre-stored in a memory unit associated with the MFP 103. For example, the one or more pages 201 may be pre-stored in an e-filing box associated with the MFP 103. The e-filing box is a personal storage box provisioned for the user 101 to store documents and to manage the stored documents in the MFP 103. The one or more pages 201 may be stored as the input data 306 in the memory 302.

In the embodiment, for scanning the one or more pages 201, the one or more properties may be stored in local memory of the MFP 103. The MFP 103 may communicate the one or more properties to the input module 311. The one or more properties may be stored in the memory 302 as the other data 310. The one or more properties may be retrieved by the processing module 314 when processing the one or more pages 201.

In an embodiment, the thumbnail image display module 312 may be configured to receive the input data 306 from the input module 311. The thumbnail image display module 312 may be configured to generate the thumbnail image 203 for each page from the one or more pages 201. The thumbnail image display module 312 may generate the thumbnail image 203 by reducing size of the one or more pages 201. For example, the thumbnail image display module 312 may use image downscaling techniques to reduce the size of the one or more pages 201. A person skilled in the art will appreciate that any known techniques other than the above-mentioned techniques may be used to generate the thumbnail image 203 for each of the one or more pages 201. In an embodiment, the thumbnail image display module 312 may generate the thumbnail images 203 directly when the one or more pages 201 are pre-stored. In another embodiment, the thumbnail image display module 312 may store a scanned version of each of the one or more pages 201 in a raw image format, when the one or more pages 201 are received from the user 101 for scanning. The thumbnail image display module 312 may generate the thumbnail images 203 from corresponding scanned version of the one or more pages 201 in the raw image format. When the scanned version of the one or more pages are stored in the raw image format, processing complexity in storing the scanned version of one or more pages 201 in a processed image format is reduced. Further, the processing complexity in post-processing the processed image format to a different image format is reduced.

Further, the thumbnail image display module 312 may be configured to display the thumbnail images 203 to the user 101. Further, the thumbnail image display module 312 may be configured to display the plurality of options 204 for processing the one or more pages 201. The plurality of options 204 may comprise at least one of (a) one or more file formats for storing the one or more pages 201 or (b) one or more transmission destinations for transmitting the one or more pages 201. The one or more file formats may be a TIFF format, a PDF format, a JPEG format, and the like. The plurality of options 204 may give the user the option to enable searchable text in the one or more pages 201. For example, a first option and a second option for a page may be a PDF format and local storage, respectively. A third option may be to enable the searchable text in the page. When such options are selected by the user 101, the searchable text may be enabled in the page stored as the PDF in the local storage. The plurality of options 204 may comprise a naming format for naming the one or more pages 201 along with the one or more file formats. The one or more transmission destinations may be USB, email, local storage, and the like. The plurality of options 204 may comprise one or more recipients intended to receive the one or more pages 201 along with the transmission destination. The plurality of options may comprise to enable archiving the one or more pages 201 before transmitting the one or more pages 201 to the transmission destination. The thumbnail images 203 generated for the one or more pages may be stored as the thumbnail image data 307 in the memory 302.

In an embodiment, the selection input module 313 may be configured to receive the thumbnail image data 307 from the thumbnail image display module 312. The selection input module 313 may be configured to receive a selection of the plurality of options 204 for the one or more pages 201, from the user 101. The user 101 may select a first group of pages from the one or more pages 201 with a first processing requirement along with corresponding options 204, from the displayed thumbnail images 203. For example, the user 101 may select pages 1, 2, and 3. The user 101 may select the TIFF format and the USB for the pages 1, 2, and 3. Further, the user 101 may select a second group of pages from the one or more pages 201 with a second processing requirement. For example, the user 101 may select pages 4, 5, 6. The user 101 may select the PDF format and the local storage for the pages 4, 5, 6. Furthermore, the user 101 may select a third group of pages from the one or more pages 201 with a third processing requirement. For example, the user 101 may select pages 7, 9, 10. The user 101 may select the JPEG format and email for the pages 7, 9, 10. In an embodiment, the selection input module 313 may select a default option (e.g., a predetermined option) for storing the scanned version of a page when the user 101 has not selected the plurality of options 204 for the page. For example, the user 101 may not select any option from the plurality of options 204 for page 8. The selection input module 313 may store the page 8 in the local storage in a default format. For example, the default format may be the PDF format. The selection of the plurality of options 204 for the one or more pages 201 received from the user 101 may be stored as the selection data 308 in the memory 302. Information related to the plurality of options 204 may be stored as the other data 310 in the memory 302.

In an embodiment, the processing module 314 may be configured to receive the selection data 308 from the selection input module 313. The processing module 314 may process the one or more pages 201, based on corresponding selection received from the user 101. The processing of the one or more pages 201 may comprise converting the one or more pages 201 to a file format (e.g., when the file format from the one or more file formats is selected by the user 101). Further, the processing of the one or more pages 201 may comprise transmitting the one or more pages 201 to a transmission destination, when the transmission destination from the one or more transmission destinations is selected by the user 101. Referring to the above example, the processing module 314 may convert the first group of pages to the TIFF format and transmit to the USB connected to the MFP 103. The processing module 314 may convert the second group of pages to the PDF format and store in the local storage of the MFP 103. The processing module 314 may convert the third group of pages to the JPEG format and mail the third group of pages to another user. In an example, the processing module 314 may name the one or more pages 201 according to the naming format selected by the user 101 and store in the local storage. In another example, the processing module 314 may enable archive for the one or more pages 201 before transmitting the one or more pages 201 and transmit the one or more pages 201 to another user.

In an embodiment, the processing module 314 is further configured to determine the selection received for a page from the one or more pages 201 to be same as a previous selection of an option from the plurality of options 204, received for the page. The processing module 314 is configured to receive pre-stored page generated by processing the page based on the previous selection, from a storage associated with the MFP 103. Further, the processing module 314 is configured to utilize the processed page instead of processing the page again based on the selection. For example, the user 101 may select the PDF format and the local storage for pages 1, 2 and 3. Further, the user 101 may select the PDF format and the email for pages 1, 4 and 5. Consider, page 1 has already been processed in the PDF format to fulfil the previous selection of the user 101. Hence, the processing module 314 receives the pre-stored page 1 in the PDF format to email to another user. Hence, time to process the page in the same format again is reduced. Data related to the processing of the one or more pages 201 may be stored as the process data 309 in the memory 302.

The other data 310 may store data, including temporary data and temporary files, generated by the one or more modules 305 for performing the various functions of the system 202. The one or more modules 305 may also include the other modules 315 to perform various miscellaneous functionalities of the system 202. For example, the other modules 315 may comprise a user interface (e.g., a user interface control module). The user interface may be used to display the thumbnail images 203 generated for each page from the one or more pages 201, and a plurality of options 204 for processing the one or more pages 201. In an embodiment, the thumbnail image display module 312 may be integrated with the user interface. The thumbnail image display module 312 may provide the generated thumbnail images 203 to the user interface. The other data 310 may be stored in the memory 302. It will be appreciated that the one or more modules 305 may be represented as a single module or a combination of different modules.

Figure 4:
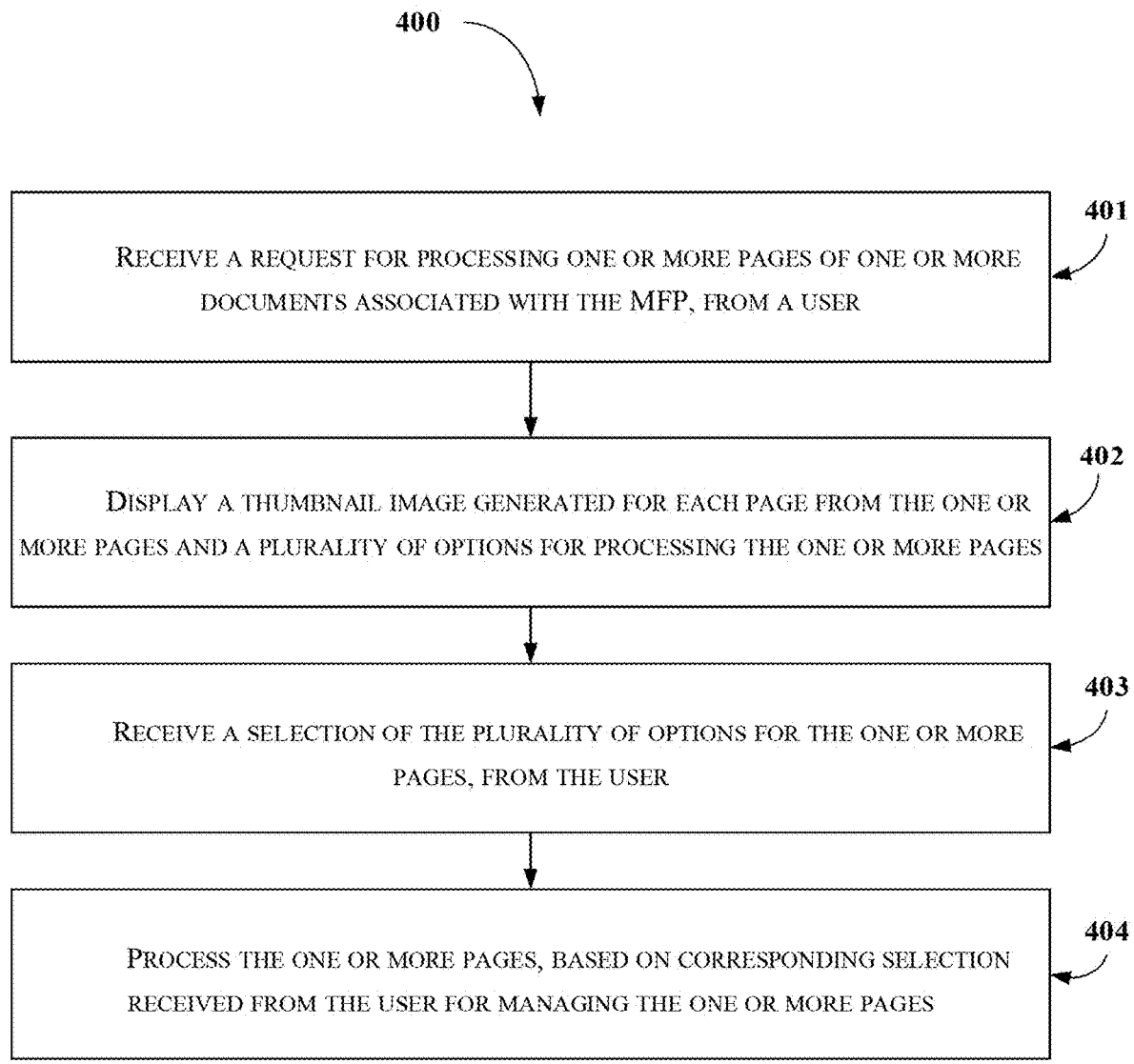
FIG. 4 shows an exemplary flow chart illustrating method steps for managing pages of documents on an MFP, in accordance with some embodiments of the present disclosure.

FIG. 4 shows an exemplary flow chart illustrating method steps for managing the one or more pages 201 of the one or more documents on the MFP 103, in accordance with some embodiments of the present disclosure. As illustrated in FIG. 4, the method 400 may comprise one or more steps. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Figure 5A:
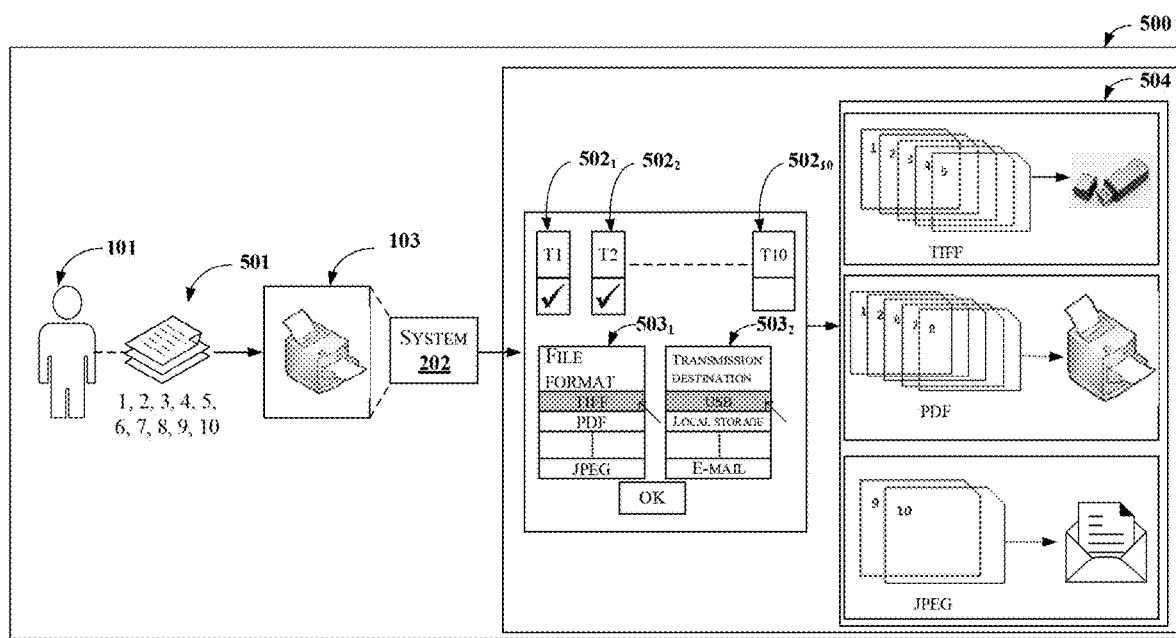
FIGS. 5A and 5B show exemplary illustrations for managing pages of documents on an MFP, in accordance with some embodiments of the present disclosure.
Figure 5B:
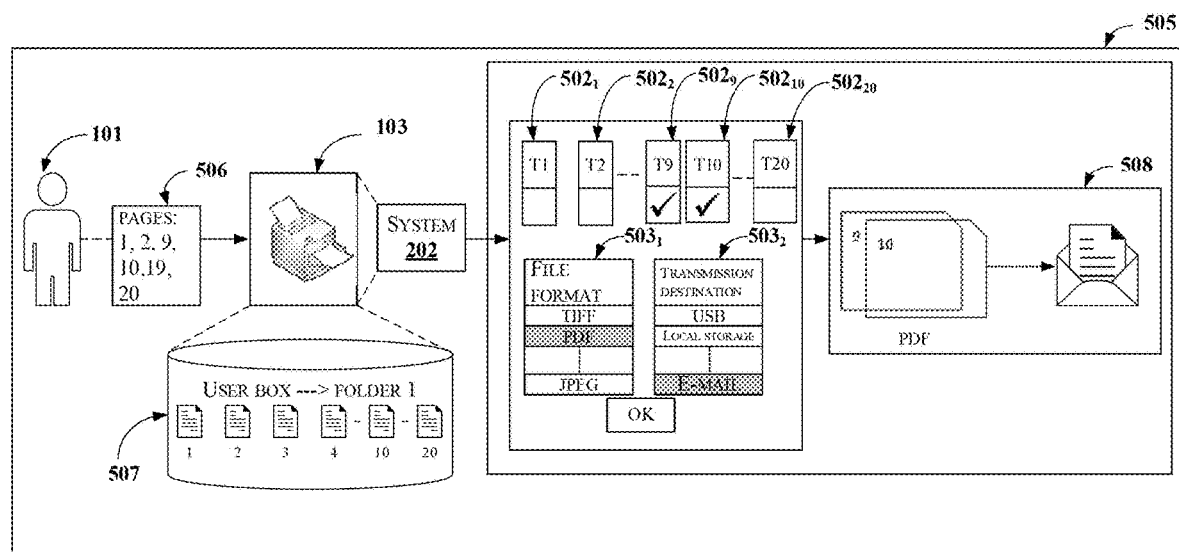

At step 401, the system 202 may receive the request for processing one or more pages 201, from the user 101. The one or more pages 201 may be from the one or more documents. In one embodiment, the request may be to perform scanning of the one or more pages 201. The one or more pages 201 of the one or more documents may be received from the user 101 along with the request for processing the one or more pages. Referring to example 500 of FIG. 5A, the user 101 may provide the request to scan pages 1-10. The pages 1-10 are represented as 501 in FIG. 5A. The user 101 may provide the one or more pages 501. The one or more properties may be same for the one or more pages 501. In another embodiment, the one or more pages 201 may be pre-stored in a memory unit associated with the MFP 103. For example, the one or more pages 201 may be pre-stored in an e-filing box associated with the MFP 103. Referring to example 505 of FIG. 5B, the user 101 may provide the request to process pages 1, 2, 9, 10, 19, and 20 (e.g., a selection of the pages). The pages 1, 2, 9, 10, 19, and 20 are represented as 506 in FIG. 5B. 507 represents the e-filing box associated with the MFP 103. A folder related to the user 101 in the e-filing box is shown in FIG. 5B. The folder comprises pages 1-20. Hence, the one or more pages 506 are pre-stored in the e-filing box 507.

Referring back to FIG. 4, at step 402, the system 202 may generate the thumbnail image 203 for each page from the one or more pages 201. Further, the system 202 may be configured to display the thumbnail images 203 to the user 101. Further, the system 202 may be configured to display the plurality of options 204 for processing the one or more pages 201. Referring again to the example 500 of FIG. 5A, the thumbnail images $502_1$, $502_2$ ..., $502_{10}$ for the one or more pages 501 and the plurality of options are displayed to the user 101. The plurality of options comprises the one or more file formats $503_1$ such as the TIFF format, the PDF format, the JPEG format, and the like. The plurality of options also comprises the one or more transmission destinations $503_2$ such as the USB, the local storage, email, and the like. Referring again to the example 505 of FIG. 5B, the thumbnail images $502_1$, $502_2$ ..., $502_9$, $502_{10}$ ..., $502_{10}$ for the one or more pages 506 and the plurality of options are displayed to the user 101. The plurality of options comprises the one or more file formats $503_1$ such as the TIFF format, the PDF format, the JPEG format, and the like. The plurality of options comprises the one or more transmission destinations $503_2$ such as the USB, the local storage, email, and the like.

Referring back to FIG. 4, at step 403, the system 202 may receive the selection of the plurality of options 204 for the one or more pages 201, from the user 101. Referring again to the example 500 of FIG. 5A, the user 101 may select the TIFF format and the USB for the pages 1, 2, 3, 4, and 5 (e.g., a first page subset). The user 101 may select the PDF format and the local storage for the pages 1, 2, 6, 7, and 8 (e.g., a second page subset). The user 101 may select the JPEG format and email for the pages 9 and 10 (e.g., a third page subset). In an embodiment, the system 202 may select a default option for storing the scanned version of a page when the user 101 has not selected the plurality of options 204 for the page. The system 202 may store the page in the local storage in a default format. For example, the default format may be the PDF format. Referring again to the example 505 of FIG. 5B, the user 101 may select the PDF format and e-mail for the pages 9 and 10. Similarly, the user 101 may select the one or more file formats $503_1$ and the one or more transmission destinations $503_2$ for other pages from the one or more pages 506.

Referring back to FIG. 4, at step 404, the system 202 may process the one or more pages 201, based on corresponding selection received from the user 101. The processing of the one or more pages 201 may comprise converting the one or more pages 201 to a file format. Further, the processing of the one or more pages 201 may comprise transmitting the one or more pages 201 to a transmission destination. Referring again to the example 500 of FIG. 5A, the system 202 may convert the first group of pages to the TIFF format and transmit to the USB connected to the MFP 103. The system 202 may convert the second group of pages to the PDF format and store in the local storage of the MFP 103. The system 202 may convert the third group of pages to the JPEG format and mail the third group of pages to another user. Output of the MFP 103 is represented as 504 in FIG. 5A. In an example, the system 202 may name the one or more pages 201 according to the naming format selected by the user 101 and store in the local storage. In another example, the system 202 may enable archive for the one or more pages 201 before transmitting the one or more pages 201 and transmit the one or more pages 201 to another user. Referring again to the example 505 of FIG. 5B, the system 202 may convert the pages 9 and 10 to the PDF format and mail to another user, represented as 508 in FIG. 5B.

Computer System

Figure 6:
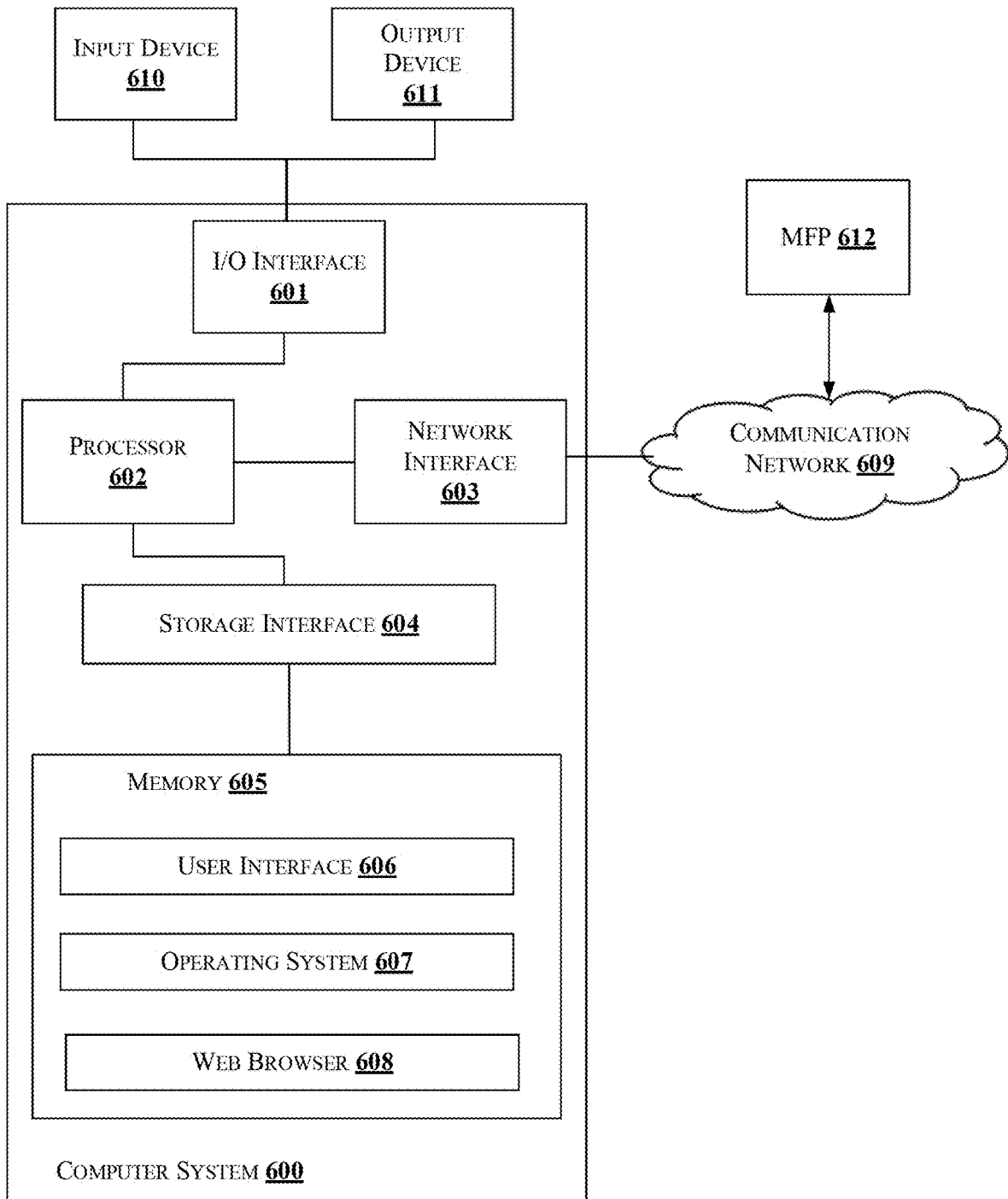
FIG. 6 shows a block diagram of a general-purpose computing system for managing pages of documents on an MFP, in accordance with embodiments of the present disclosure.

FIG. 6 illustrates a block diagram of an exemplary computer system 600 for implementing embodiments consistent with the present disclosure. In an embodiment, the computer system 600 (e.g., a controller) may be used to implement the system 202. Thus, the computer system 600 may be used for managing the one or more pages 201 of the one or more documents on the MFP 103. In an embodiment, the computer system 600 may communicate with the MFP 612 over the communication network 609. The computer system 600 may comprise a Central Processing Unit 602 (also referred as "CPU" or "processor"). The processor 602 may comprise at least one data processor. The processor 602 may include specialized processing units such as integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE (Institute of Electrical and Electronics Engineers)-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices (e.g., a portion of a user interface). For example, the input device 610 may be an antenna, keyboard, mouse, joystick, remote control (e.g., infrared), camera, card reader, fax machine, dongle, biometric reader, microphone, touch screen, touchpad, trackball, stylus, scanner, storage device, transceiver, video device/source, etc. The output device 611 (e.g., a portion of a user interface) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The computer system 600 may be connected to the MFP 612 through a communication network 609. The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and the like. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607, web browser 608 etc. In some embodiments, computer system 600 may store user/application data, such as, the data, variables, records, etc., as described in this disclosure. Such databases may be implemented as fault-tolerant, relational, scalable, secure databases such as Oracle® or Sybase®.

The operating system 607 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 600 may implement the web browser 608 stored program component. The web browser 608 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX™, DHTML™, ADOBE® FLASH™, JAVASCRIPT™, JAVA™, Application Programming Interfaces (APIs), etc. In some embodiments, the computer system 600 may implement a mail server (not shown in Figure) stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 600 may implement a mail client stored program component. The mail client (not shown in Figure) may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, Compact Disc Read-Only Memory (CD ROMs), Digital Video Disc (DVDs), flash drives, disks, and any other known physical storage media.

Embodiments of the present disclosure allow a user to provide a request for processing multiple pages with different processing requirements at once. Appropriate options can be specified by the user to process different pages based on processing requirement. The present disclosure provides a time-efficient process and enhances user experience when operating the MFP. Hence, processing of the multiple pages is managed efficiently.

The present disclosure utilizes options selected by user to process previous pages for processing a current page. Hence, time and resources to process the page in the same format again is reduced.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method for page management for use with an image forming apparatus, the method comprising:
   receiving, by a controller associated with the image forming apparatus, a request from a user for processing one or more pages of one or more documents;
   displaying, on a display by the controller, (a) a thumbnail image generated for each page and (b) a plurality of options for processing the one or more pages, the options comprising at least one of (i) one or more file formats for storing the one or more pages or (ii) one or more transmission destinations for transmitting the one or more pages;
   receiving, by the controller, a selection by the user of at least one option of the plurality of options; and
   processing, by the controller, the one or more pages according to the at least one option of the selection received from the user.

2. The method of claim 1, wherein processing the one or more pages comprises at least one of (a) converting the one or more pages to a file format selected from the one or more file formats or (b) transmitting the one or more pages to a transmission destination selected from the one or more transmission destinations.

3. The method of claim 1, wherein processing the one or more pages comprises:
   determining the selection received for a page from the one or more pages to be the same as a previous selection received for the page;
   retrieving, from a memory associated with the image forming apparatus, a pre-stored page that was previously generated by processing the page based on the previous selection; and
   utilizing the pre-stored page instead of processing the page based on the selection.

4. The method of claim 1, wherein the one or more pages of the one or more documents are at least one of (a) received from a scanner or (b) pre-stored in a memory unit associated with the image forming apparatus.

5. The method of claim 1, wherein the selection is a first selection, the method further comprising:
   receiving, by the controller, a second selection by the user of at least one of the thumbnail images, the second selection corresponding to the one or more pages that the user wishes to be processed, wherein processing the one or more pages comprises processing the one or more pages based on the first selection and the second selection.

6. The method of claim 1, wherein:
the selection is a first selection;
the one or more pages include a first page subset and a second page subset;
the first selection corresponds to at least one option for processing the first page subset;
the method further comprises receiving, by the controller, a second selection by the user of at least one option of the plurality of options for processing the second page subset; and
processing the one or more pages includes (a) processing the first page subset according to the at least one option of the first selection and (b) processing the second page subset according to the at least one option of the second selection.

7. The method of claim 6, wherein the first page subset includes a plurality of the pages.

8. The method of claim 1, wherein the plurality of options for processing the one or more pages further comprises at least one of (a) a naming format for the one or more pages, or (b) an indication of whether to enable searchable text in the one or more pages.

9. The method of claim 1, wherein the one or more pages of the one or more documents are one or more first pages, the method further comprising:
identifying, by the controller, one or more second pages of the one or more documents for which an option was not selected by the user; and
processing, by the controller, the one or more second pages according to a predetermined option.

10. A system for page management for an image forming apparatus, the system comprising:
one or more processors; and
a memory storing processor-executable instructions, which, on execution, cause the one or more processors to:
receive a request from a user for processing one or more pages of one or more documents;
control a display to display (a) a thumbnail image generated for each page and (b) a plurality of options for processing the one or more pages, the options comprising at least one of (i) one or more file formats for storing the one or more pages or (ii) one or more transmission destinations for transmitting the one or more pages;
receive a selection by the user of at least one option of the plurality of options; and
process the one or more pages according to the at least one option of the selection from the user.

11. The system of claim 10, wherein the one or more processors processes the one or more pages by at least one of (a) converting the one or more pages to a file format selected from the one or more file formats or (b) transmitting the one or more pages to a transmission destination selected from the one or more transmission destinations.

12. The system of claim 10, wherein processing the one or more pages, by the one or more processors, further comprises:
determining the selection received for a page from the one or more pages to be the same as a previous selection received for the page;
receiving, from a memory associated with the image forming apparatus, a pre-stored page that was previously generated by processing the page based on the previous selection; and
utilizing the processed page instead of processing the page based on the selection.

13. The system of claim 10, wherein the one or more pages of the one or more documents are at least one of (a) received from a scanner or (b) pre-stored in a memory unit associated with the image forming apparatus.

14. A non-transitory computer readable medium including instructions stored thereon that, when processed by at least one processor, cause a device to perform operations comprising:
receiving a request from a user for processing one or more pages of one or more documents;
displaying, on a display, (a) a thumbnail image generated for each page and (b) a plurality of options for processing the one or more pages, the options comprising at least one of ci) one or more file formats for storing the one or more pages or (ii) one or more transmission destinations for transmitting the one or more pages;
receiving a selection by the user of at least one option of the plurality of options; and
processing the one or more pages according to the at least one option of the selection received from the user.

15. The medium of claim 14, wherein processing the one or more pages comprises at least one of (a) converting the one or more pages to a file format selected from the one or more file formats or (b) transmitting the one or more pages to a transmission destination selected from the one or more transmission destinations.

16. The medium of claim 14, wherein processing the one or more pages comprises:
determining the selection received for a page from the one or more pages to be the same as a previous selection of an option received for the page;
retrieving, from a memory associated with the image forming apparatus, a pre-stored page that was previously generated by processing the page based on the previous selection; and
utilizing the processed page instead of processing the page based on the selection.

17. The medium of claim 14, wherein the one or more pages of the one or more documents are at least one of (a) received from a scanner or (b) pre-stored in a memory unit associated with the image forming apparatus.

* * * * *